United States Patent [19]

Kochajda

[11] Patent Number: 5,039,842

[45] Date of Patent: Aug. 13, 1991

[54] MOLD HEATER MOISTURE DETECTION AND DRY OUT APPARATUS

[75] Inventor: Michael J. Kochajda, Sterling Heights, Mich.

[73] Assignee: Fairchild Industries, Inc., Chantilly, Va.

[21] Appl. No.: 362,554

[22] Filed: Jun. 7, 1989

[51] Int. Cl.[5] .................................. H05B 1/02
[52] U.S. Cl. ...................... 219/501; 219/497; 219/505; 219/509; 340/640; 340/664; 361/87; 324/522
[58] Field of Search ............... 219/494, 497, 501, 505, 219/506, 508, 509, 331, 453, 250, 536; 340/664, 640; 361/57, 87; 324/522, 511

[56] References Cited

U.S. PATENT DOCUMENTS

| | | | |
|---|---|---|---|
| 4,103,319 | 7/1978 | Crain et al. | 219/328 |
| 4,314,143 | 2/1982 | Bilstad et al. | 219/506 |
| 4,825,199 | 4/1989 | Antilozi | 340/640 |

Primary Examiner—M. H. Paschall
Attorney, Agent, or Firm—Michael W. York

[57] ABSTRACT

Plastic mold heater moisture detection and dry out apparatus for detecting the presence of moisture in the plastic molding heaters and for drying out the heaters. The plastic mold heater moisture detection and dry out apparatus includes a heater leakage current sensor, an analog to digital converter, a microprocessor, and a triac that are operatively connected to a heater temperature sensor and the heaters. The plastic mold heater moisture detection and dry out apparatus monitors the heater leakage current that is due to moisture or the like present in the heaters and depending upon the value of this leakage current either permits normal heater operation, dries out the heaters or shuts off power if an unsafe ground fault situation exists. In drying out the heaters a series of increasing voltages are applied to the heaters during successive loops or passes to avoid heater electrical arcing that could damage and degrade the heaters.

7 Claims, 5 Drawing Sheets

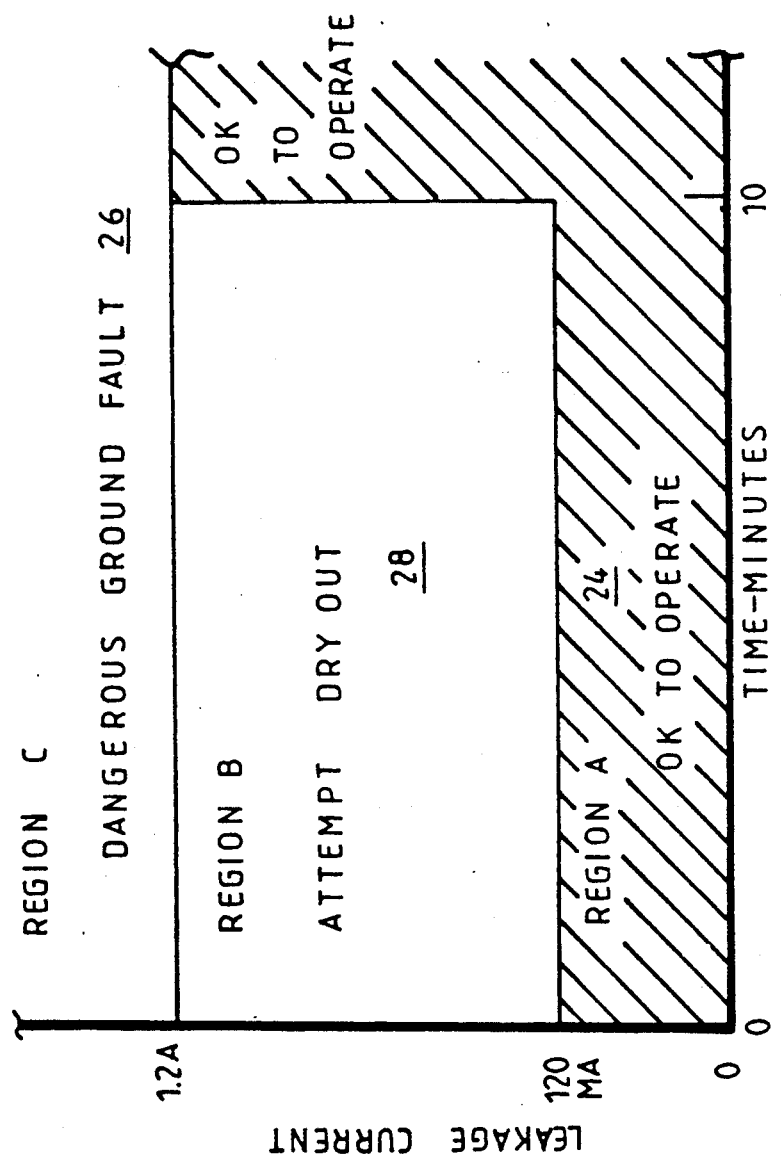

MOLD HEATER MOISTURE DETECTION AND DRY OUT APPARATUS

BACKGROUND OF THE INVENTION

Heaters are used in plastic molding operations to keep the molding material in a fluid state during molding operations. Unfortunately, such heaters can collect moisture from condensation and the like. A heater that has a sufficient amount of moisture can have dangerously high leakage currents as a result of this moisture that can damage or destroy the heater and related equipment and possibly cause injury if full heater power is applied when this moisture is present.

If too much moisture is present in the heater, then it is necessary to service and possibly repair the heater prior to its being used. However, if only a moderate amount of moisture is present in the heater it is possible to remove the moisture by drying and then put the heater into use. This drying can be accomplished by applying only a small amount of power to the heater until the heater is dried out. However, if this drying is accomplished with too much voltage then internal heater arcing can occur inside the magnesium oxide heater insulator which leaves carbon deposits inside the heater. Such carbon deposits inside the heater adversely affect heater performance and cause permanent heater deterioration.

It is of course possible to manually apply a comparatively low voltage to the heater to attempt to dry it out blindly, but this is in practice not efficient and does not avoid possible heater damage. Also, if a severe moisture problem is present or a ground fault occurs then the heater would potentially be damaged and should not be used, but instead should be shut down. A definite need exists to automatically check a heater for moisture and/or a ground fault situation and to shut down the system if necessary or to dry out the heater if it is possible and to dry it out in a manner that minimizes heater damage.

This invention overcomes these problems associated with the use of heaters that may have moisture that could cause damage to the heater and allows the heater to be checked for the presence of moisture or a ground fault. The invention shuts down the system if a dangerous situation exists or subjects the heater to dry out cycles to allow it to be operated normally if it is possible. This drying out of the heater is accomplished in such a manner that heater damage is minimized.

SUMMARY OF THE INVENTION

This invention relates to heater drying apparatus and more particularly to heater drying apparatus that functions automatically.

It is therefore an object of the present invention to provide a heater moisture detection and dry out apparatus that operates automatically.

It is an object of the invention to provide heater moisture detection and dry out apparatus that determines if the heater can be safely dried out.

It is an object of the invention to provide heater moisture detection and dry out apparatus that also dries out the heater if it is safe to do so.

It is an object of the invention to provide heater moisture detection and dry out apparatus that is particularly adapted for use in connection with mold heaters.

It is an object of the invention to provide heater moisture detection and dry out apparatus that dries out a heater in a manner that avoids damage to the heater.

It is an object of the invention to provide heater moisture detection and dry out apparatus that prevents electrical arcing in the heater while the heater is being dried out.

It is also an object of the invention to provide heater moisture detection and dry out apparatus that shuts down the heater system if it is not safe to dry out the heater.

It is also an object of the invention to provide heater moisture detection and dry out apparatus that uses low voltages to dry out the heater to avoid damage to the heater.

It is also a object of the invention to provide heater moisture detection and dry out apparatus in which heater damage is avoided by using a series of reduced voltages that are applied to the heater.

It is also an object of the invention to provide heater moisture detection and dry out apparatus that avoids heater damage by applying cycles of incremental dry out voltages that increase in value.

It is an object of the invention to provide heater moisture detection and dry out apparatus that has a plurality of heater voltage cycles for use with different heater leakage currents caused by different heater moisture levels.

It is an object of the invention to provide heater moisture detection and dry out apparatus that applies cycles of incremental dry out voltages and also periodically checks the heater leakage current.

It is an object of the invention to provide heater moisture detection and dry out apparatus that can discriminate between a power interruption and an initial start up situation.

These and other objects are obtained from the present invention of a heater moisture detection and dry out apparatus which includes means for detecting moisture in the heater, means for determining if it is safe to dry out the heater and means for safely drying out the heater to avoid heater damage. The means for safely drying out the heater include two different heater drying cycles and means for selecting the cycle depending upon the heater leakage current caused by the moisture present in the heater.

BRIEF DESCRIPTION OF THE DRAWINGS

The invention will be hereinafter described in considerable detail with reference to the appended drawings in which:

FIG. 5 is a graph of heater leakage current versus time associated with the operation set forth in FIGS. 2 through 4 illustrating the overall operation of the heater moisture detection and dry out apparatus.

DETAILED DESCRIPTION OF THE PREFERRED EMBODIMENT

Figure 1:
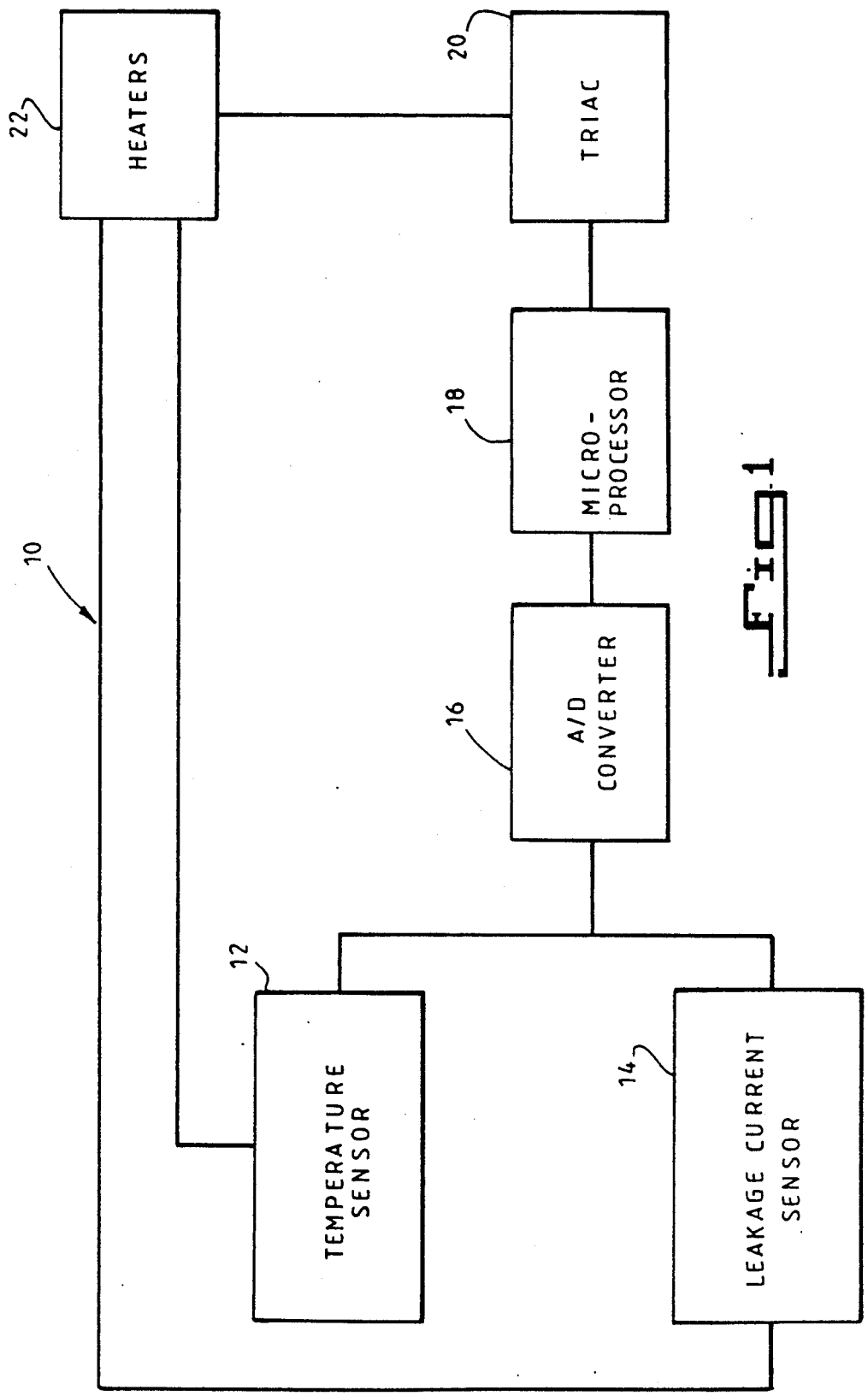
FIG. 1 is a circuit block diagram of the heater moisture detection and dry out apparatus invention.

Referring first to FIG. 1, the heater moisture detection and dry out apparatus is illustrated and is designated generally by the number 10. As illustrated the heater moisture detection and dry out apparatus 10 comprises a temperature sensor 12, a heater leakage current sensor 14, an analog to digital converter 16, a microprocessor 18 and a triac 20. The temperature sensor 12 and the leakage current sensor 14 are connected individually electronically to a conventional mold heater or heaters 22 known in the art and the outputs from the temperature sensor 12 and the leakage current sensor 14 are connected electronically to the analog to digital converter 16. The output of the analog to digital converter 16 is in turn connected electronically to the microprocessor 18 which is in turn connected electronically to the triac 20 that is in turn connected electronically to the mold heater or heaters 22.

The temperature sensor 12 during normal operation and for this invention also provides the very important heater 22 temperature information that is used to make important decisions. The leakage current sensor 14 provides important heater 22 leakage current information that is also used to make important decisions. The magnitude of the heater 22 leakage current is directly related to the magnitude of the moisture in the heater 22. Consequently, if the heater 22 moisture level is high, the heater leakage current will also be high and if the heater 22 leakage current is low the moisture level will also be low.

Since the signals or information on heater temperature and heater leakage current are in analog form, the analog to digital converter 16 converts these signals to digital form and sends them to the microprocessor 18 where they are processed in a manner that will be hereinafter described in considerable detail. The triac 20 applies power in various magnitudes to the heaters 22 based upon instruction signals from the microprocessor 18. The individual functional blocks comprising the temperature sensor 12, the leakage current sensor 14, the analog to digital converter 16, the microprocessor 18 and the triac are known in the art and comprise conventional components and hence need not be described in further detail.

Figure 2:
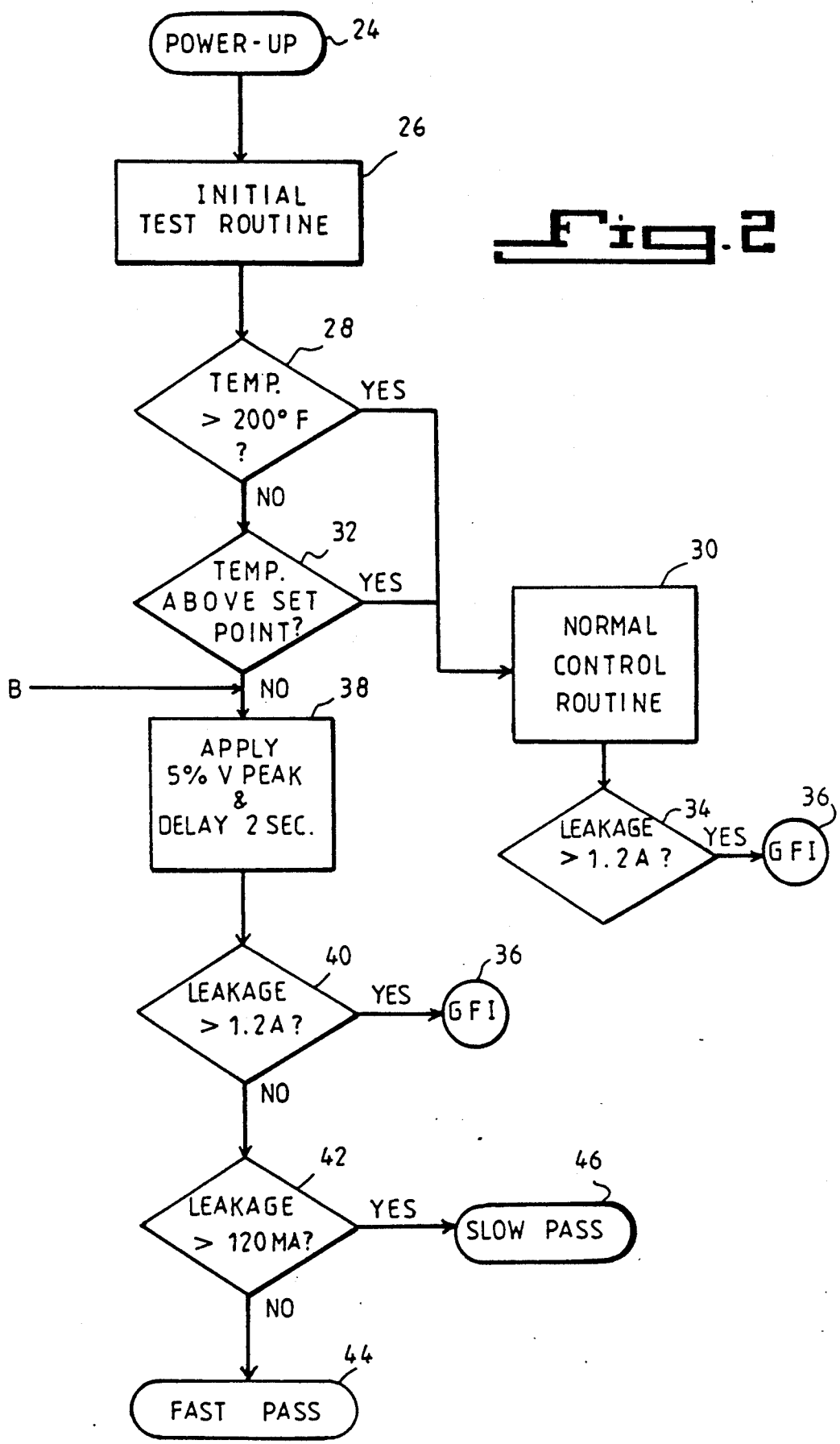
FIG. 2 is a flow chart of the overall operation of the heater moisture detection and dry out apparatus invention.

FIG. 2 illustrates a flow diagram or chart of the logic steps of the operating program stored in and performed in the microprocessor 18 that is utilized by the heater moisture detection and dry out apparatus 10. As indicated in FIG. 2 when the power is applied as indicated in label 24 to the heater moisture detection and dry out apparatus 10 an initial test routine starts as represented in block 26 and determines if the start up is due to a power failure or the like. If power was recently previously applied to the heaters 22 then they should be hot or warm consequently, if the answer to the question set forth in block 28 about the heater temperature being greater than 200 degrees F. is "Yes" then the normal control routine indicated in block 30 is instituted by the microprocessor 18. However, if the answer is "No" then the question asked as indicated in the decision block 32 is whether the temperature is above the set point and if the answer is "Yes" then the normal control routine indicated in block 30 is instituted by the microprocessor 18. This computer programming arrangement represented by the blocks 26, 28 and 32 comprises means for determining if the need for the heater power application start up is due to a power interruption or the like and if it is then the normal control routine is established as represented by block 30.

In connection with the normal control routine, it should be noted that if there is a yes answer to the question indicated in block 34 about the heater leakage current being greater than 1.2 amperes, then only the triac 20 and the heaters 22 are shut down by the ground fault interrupt (GFI) set forth in circle 36. Consequently, the foregoing programming represented by the block 34 and label 36 comprise means for preventing damage to the heater 22 due to excessive electrical current caused by a ground fault in the heater 22. It should be noted that this safety routine can occur at anytime during operation of the heater 22 system and is not limited to a start up situation.

As indicated in FIG. 2 if the answer to the two questions in blocks 28 and 32 about the heater temperature being above 200 degrees F and the temperature being above the set point is "No" there then the normal moisture check out routine is established. The first step in this normal moisture check out routine is illustrated in block 38 and is to apply five percent (5%) of the peak heater voltage to the heaters 22. Then there is a two second delay to establish steady state conditions which is illustrated in block 38. Then if the heater leakage current is greater than 1.2 amperes (amps) as illustrated in block 40 the ground fault interrupt (GFI) in circle 36 will shut down only the triac 20 and the heaters 22. If the answer to the question about the heater leakage current being greater than 1.2 amperes is "No", then the question is presented of whether the leakage current is greater than 120 milliamperes as indicated in block 42. If the answer is "No" then the fast pass loop illustrated by label 44 is instituted that is set forth in FIG. 3. If the answer is "Yes" then the slow pass dry out proceedure of label 46 is instituted that is set forth in FIG. 4.

Figure 3:
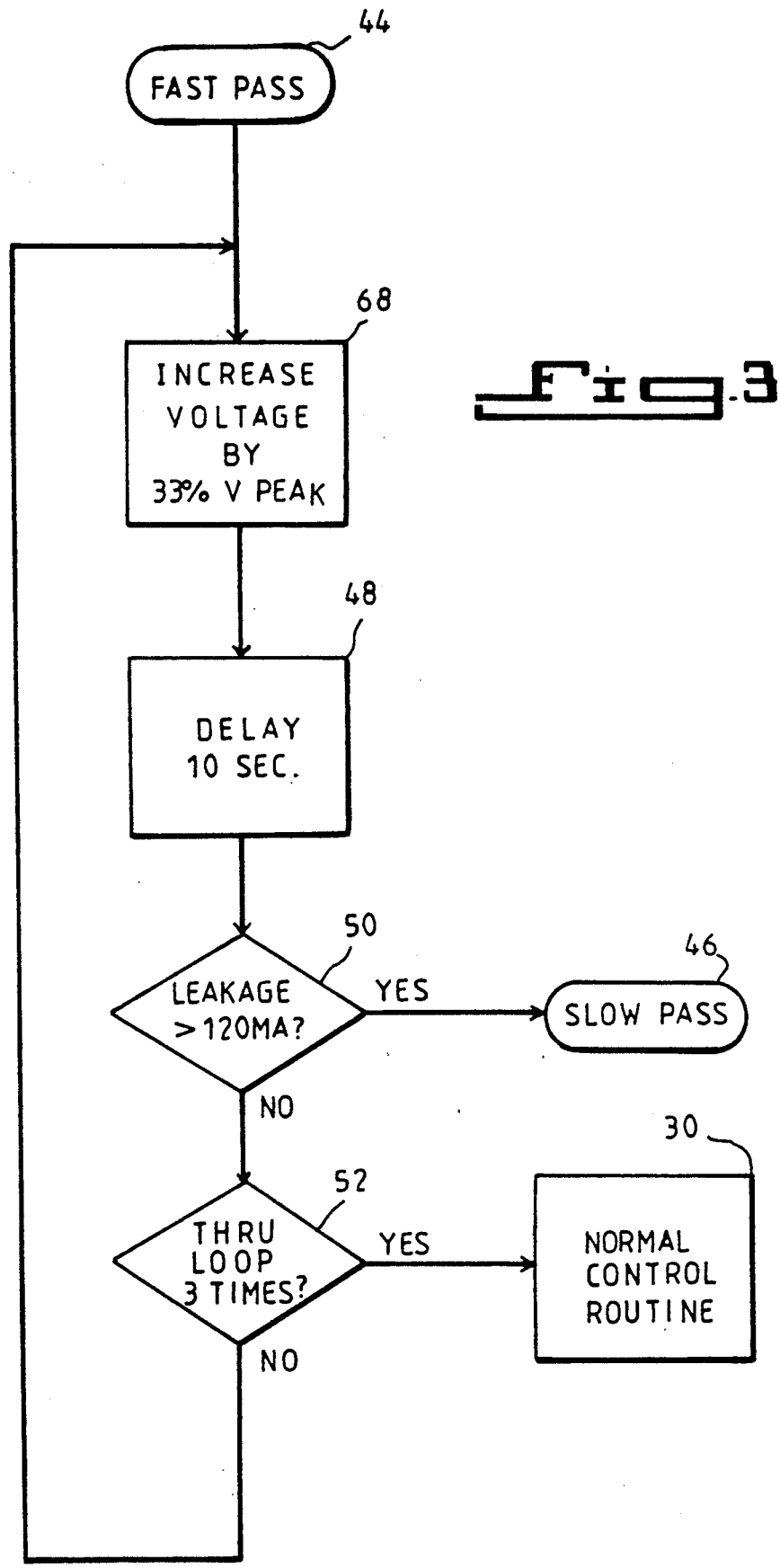
FIG. 3 is a flow chart of the fast pass cycle forming part of the operation illustrated in FIG. 2.

As indicated, the fast pass routine is set forth in FIG. 3. In the fast pass routine represented by label 44 the first step as represented in block 68 is to increase the heater voltage to thirty three percent (33%) of the peak heater voltage. Then there is a delay of ten seconds indicated in block 48 to establish steady state conditions and then a check, as indicated in block 50. is made to see if the heater leakage current is above 120 milliamperes. If the heater leakage current is greater than 120 milliamperes then the slow pass routine of label 46 is instituted and if it is not then a check is made to see if the fast pass loop has been gone through three times as indicated in block 52. If the loop has not been gone through three times, then the fast pass loop is repeated. If the fast pass loop has been gone through three times, then the normal routine control of block 30 is instituted. Consequently, the fast pass routine is gone through three times unless the heater leakage current is greater than 120 milliamperes which results in a shift to the slow pass routine.

Figure 4:
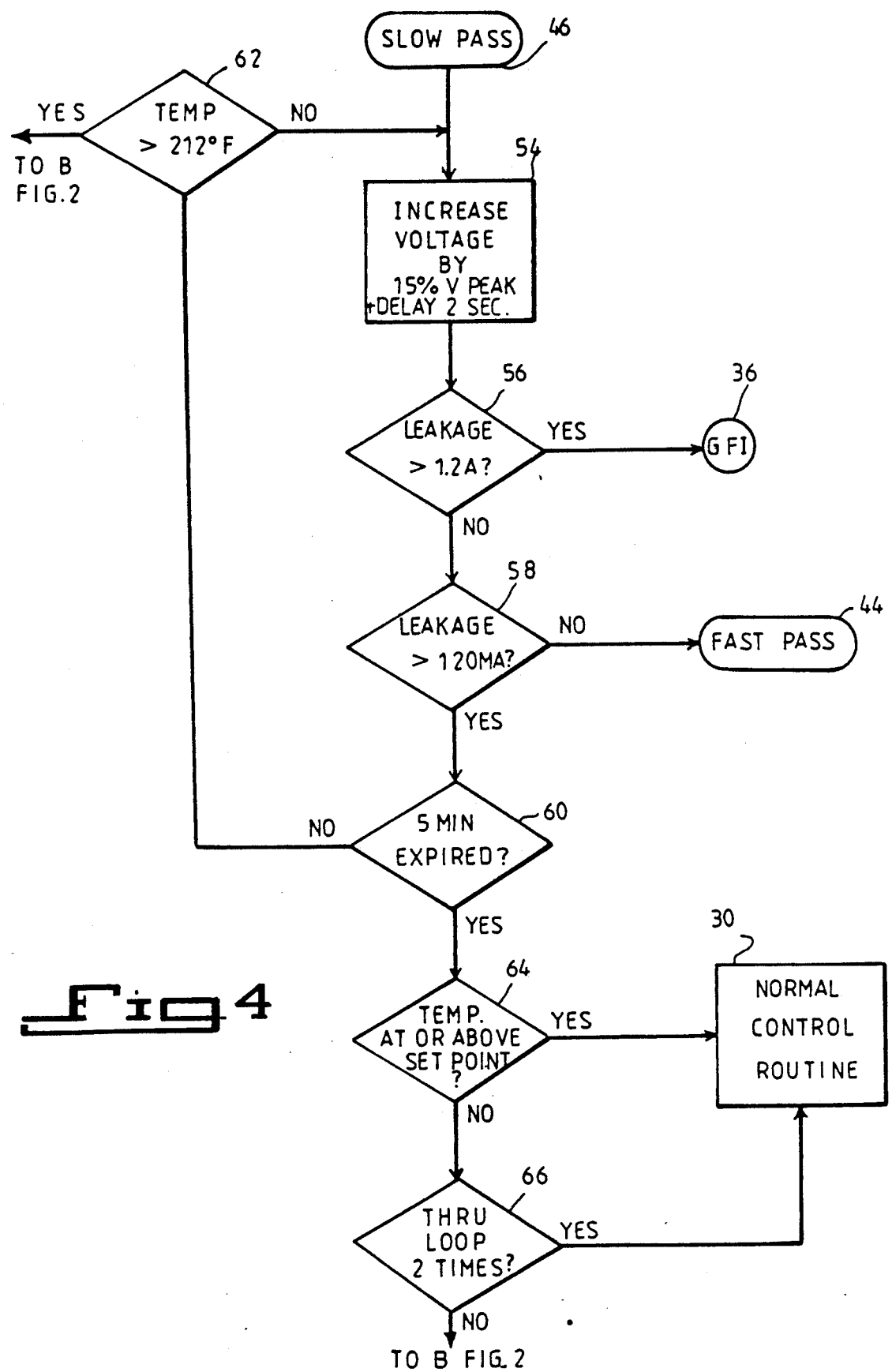
FIG. 4 is a flow chart of the slow pass cycle forming part of the operation illustrated in FIGS. 2 and 3.

The slow pass routine of label 46 is illustrated in FIG. 4 where as illustrated the first step is to increase peak heater voltage by fifteen percent (15%) as represented by block 54. Then, as illustrated in block 54, there is a delay of two seconds for stabilization and a check is made as indicated in block 56 to see if the heater leakage current is greater than 1.2 amperes and if it is then the triac 20 and the heaters 22 are shut down by the ground fault interrupt (GFI) of label 36. If the current is less than 1.2 amperes then the next check of block 58 is to see if the heater leakage current is greater than 120 milliamperes. If the heater leakage current is less than 120 milliamperes then a shift is made so the fast pass routine of label 44 is gone through. If the heater leakage current is greater than 120 milliamperes then the next check that is made is to see if five minutes have expired (block 60) since the start of the slow pass routine 46. If five minutes have not expired then a check as indicated in block 62 is made to see if the heater 22 temperature is greater than 212 degrees F., the temperature at which water normally boils. If the heater 22 temperature is less than 212 degrees F. then the slow pass loop is gone through again. However, if the heater 22 temperature is greater than 212 degrees F. then the routine shifts back to the initial application of only five percent (5%) of the heater peak voltage and consequently, the heater 22 is allowed to cool and the routine continues as previously described.

If five minutes have expired, then a check is made to see if the heater 22 temperature is at or above the set point as indicated in block 64 and if it is then there is a switch to the normal heater temperature control routine indicated in block 30. If the heater 22 temperature is not at or above the set point then the question presented in block 66 is whether this slow pass loop has been gone through two times. If the slow pass loop has been gone through two times then the normal heater temperature control routine 30 takes over. If the loop has not been gone through two times, then the routine starts over again with the application of five percent (5%) of the peak heater voltage and continues in the previously indicated manner. The combined fast pass computer routine of FIG. 3 and the slow pass computer routine of FIG. 4 comprise means for preventing heater 22 from electrically arcing due to excessive moisture in the heater 22. As indicated by the foregoing, the fast pass routine 44 also comprises means for saving drying time in drying out the heater or heaters 22 under appropriately lower heater moisture conditions over the slow pass routine 46 that must be used to prevent heater 22 damage under higher heater moisture conditions.

The graph set forth in FIG. 5 summarizes what the foregoing flow chart routines accomplish. FIG. 5 is a graph of heater leakage current versus time from start up of the heaters 22 or from the time power is applied to the heaters 22. As indicated in FIG. 5 if the heater leakage current is less than or equal to 120 milliamperes, then the heaters 22 are permitted to operate in their normal control routine at anytime. This is indicated and labeled as Region A and also identified by the number 24. On the other hand, if the heater leakage current is greater than 1.2 amperes then the heater 22 is in Region C also identified by the number 26 and this Region C is the dangerous ground fault region where the heaters 22 and the associated triac 20 are shut down since the heaters 22 cannot be safely dried out or operated. Then as indicated there is a Region B also designated as number 28 where dry out of the heaters 22 is attempted in accordance with the previously described flow chart routine. It should be noted that this Region B only extends for some ten minutes after power is applied to the heaters 22 and after this ten minutes then normal operation is permitted as long as the heater leakage current is less than 1.2 amperes.

The heater moisture detection and dry out apparatus 10 that performs as indicated in the graph in FIG. 5 and as indicated previously with reference to the flow charts of FIGS. 2 through 4 prevents operation of the heaters 22 when there is ground fault or the like that could seriously damage equipment and perhaps cause personal injury, but the heater moisture detection and dry out apparatus 10 permits the heaters 22 to be dried out in a safe manner that avoids damage to the heaters 22 when it is determined that the leakage current of the heaters 22 is in a region that permits the heaters to be dried out without damage. The heater moisture detection and dry out apparatus 10 also permits normal operational control of the heaters 22 without going through any unnecessary dry out routine or process when it is determined that the heater leakage current is satisfactorily low for such operation. This feature avoids any unnecessary delays in starting up the heaters 22.

The mold heater moisture detection and dry out apparatus 10 is made and used in the following manner. As indicated in FIG. 1 the mold heater moisture detection and dry out apparatus 10 uses a mold temperature sensor 12, analog to digital converter 16, microprocessor 18, triac 20 and heaters 22 that are themselves known in the art and used in previous plastic molding operations. Such temperature sensors 12, analog to digital converters 16, microprocessors 18, triac 20 and heaters 22 are available from D-M-E Company of Madison Heights, Mich. The leakage current sensor 14 is a component that in itself is known generally in the art that is modified as previously indicated to provide the important functioning for the mold heater moisture detection and dry out apparatus 10. Such modifications include the programming of the microprocessor 18 in the manner indicated by the previously described flow charts of FIGS. 2 through 4 and the connection of the mold heater moisture detection and dry out apparatus 10 so that its ground fault interrupt 36 is activated as previously indicated by the microprocessor 18 and also as previously indicated the triac 20 is controlled by the microprocessor 18 to apply the appropriate voltage to the heaters 22.

The mold heater moisture detection and dry out apparatus 10 is used in the following manner. As indicated previously, normal molding operations use the temperature sensor 12, the analog to digital converter 16, the microprocessor 18, the triac 20 and of course the mold heaters 22. This invention adds the leakage current sensor 14 which is used to determine heater 22 leakage current conditions during heater 22 dry out, which is activated anytime electrical heater power is about to be applied to the heaters by the microprocessor 18, through the triac 20, and this causes the previously described fast pass and slow pass dry out routines 44 and 46 when it is appropriate based upon the heater leakage current in the heaters 22 that is detected by the heater leakage current sensor 14. The magnetude of the heater 22 leakage current is related to the magnitude of the moisture present in the heater 22. As indicated previously, after the appropriate heater dry out routine or routines, if required, the heaters 22 operate under the normal control routine of the mold heater moisture detection and dry out apparatus 10.

Although this invention has been described in considerable detail with reference to a certain preferred embodiment, it will be understood that variations and modifications may be made to the invention without departing from the spirit and scope of the invention as set forth in the appended claims.

What is claimed is:

1. Mold heater moisture detection and dry out apparatus for use with at least one mold heater and a mold heater temperature sensor comprising a mold heater leakage current sensor connectable to said mold heater and to said mold heater temperature sensor, heater drying control means operatively connected to said mold-heater leakage current sensor and connectable to said mold heater temperature sensor for use in controlling the operation of said mold heater, said heater drying control means comprising means for controlling the operation of said mold heater based upon heater leakage current information from said mold heater leakage current sensor comprising a microprocessor, said microprocessor including means for determining if heater leakage current is above a certain value and if it is to conduct a long slow pass heater dry out routine and if it is not to conduct a shorter fast pass heater dry out routine, analog to digital conversion means associated with said mold heater leakage current sensor and operatively connected to said microprocessor for converting analog signals from said mold heater leakage current sensor to digital signals for use by said microprocessor and means for applying a heater dry out voltage to said mold heater connected to said microprocessor and connectable to said mold heater for drying out said mold heater under the control of said microprocessor.

2. The mold heater moisture detection and dry out apparatus of claim 1 wherein said microprocessor includes means for causing the application of increased voltages to said mold heater to bring the temperature of said mold heater above the boiling point of water without excessive voltage that might be damaging to said mold heater.

3. The mold heater moisture detection and dry out apparatus of claim 1 wherein the slow pass routine results in the application of incremental voltages to said heater which are less than the incremental voltages applied to said heater with the fast pass routine.

4. The mold heater detection and dry out apparatus of claim 1 wherein said mold heater temperature sensor includes ground fault interrupt means for removing electrical power from said mold heater.

5. The mold heater detection and dry out apparatus of claim 4 wherein microprocessor includes means for controlling said ground fault interrupt means.

6. The mold heater detection and dry out apparatus of claim 5 wherein said microprocessor includes means for controlling the application of increasingly higher voltages to said heater.

7. The mold heater detection and dry out apparatus of claim 6 wherein said means for applying a heater dry out voltage comprises a triac.

* * * * *